(12) United States Patent
Crocker et al.

(10) Patent No.: US 10,502,334 B2
(45) Date of Patent: Dec. 10, 2019

(54) CABLE ACTUATED REMOTE EMERGENCY SHUT-OFF SYSTEM

(71) Applicant: HEXAGON TECHNOLOGY AS, Alesund (NO)

(72) Inventors: Ryan Crocker, Lincoln, NE (US); Ken Halvorsen, Lincoln, NE (US)

(73) Assignee: Hexagon Technology AS, Alesund (NO)

( * ) Notice: Subject to any disclaimer, the term of this patent is extended or adjusted under 35 U.S.C. 154(b) by 47 days.

(21) Appl. No.: 15/643,999

(22) Filed: Jul. 7, 2017

(65) Prior Publication Data

US 2018/0017182 A1 Jan. 18, 2018

Related U.S. Application Data

(60) Provisional application No. 62/362,307, filed on Jul. 14, 2016.

(51) Int. Cl.
*F16K 31/46* (2006.01)
*F16K 31/528* (2006.01)
(Continued)

(52) U.S. Cl.
CPC ........ *F16K 17/0486* (2013.01); *F16K 17/168* (2013.01); *F16K 31/465* (2013.01);
(Continued)

(58) Field of Classification Search
CPC ...... F17C 13/04; F16K 35/10; F16K 17/0486; F16K 17/168; F16K 31/465; F16K 31/528; F16K 35/12
(Continued)

(56) References Cited

U.S. PATENT DOCUMENTS 1,473,481 A 11/1923 Kleist
3,165,236 A 1/1965 Beazer
(Continued)

FOREIGN PATENT DOCUMENTS

BE 557971 A 11/1957
CN 201982681 9/2011
(Continued)

OTHER PUBLICATIONS

International Search Report and Written Opinion dated Sep. 29, 2017, for International Application No. PCT/US2017/037891.
(Continued)

*Primary Examiner* — Kevin F Murphy
*Assistant Examiner* — Kelsey E Cary
(74) *Attorney, Agent, or Firm* — Mai-Tram D. Lauer; Westman, Champlin & Koehler, P.A.

(57) ABSTRACT

A system includes a valve, handle, guide, arm, channel, and projection. The handle is proximate the valve and is configured to open and close the valve. The handle is in a first position when the valve is open and in a second position when the valve is closed. The guide is connected to the handle. The arm is connected to the guide. The channel is located on one of the guide or the arm, the channel having opposed first and second ends. The projection is located on the other of the guide or the arm, the projection configured to be received in the channel. Moving the projection past a location of the first end of the channel pulls the guide and the handle, thereby moving the handle from the first position to the second position. The projection can be moved toward the second end while the handle remains in the second position.

18 Claims, 4 Drawing Sheets

(51) Int. Cl.
*F16K 17/04* (2006.01)
*F16K 17/168* (2006.01)
*F17C 13/04* (2006.01)
*F16K 13/08* (2006.01)

(52) U.S. Cl.
CPC ............ *F16K 31/528* (2013.01); *F17C 13/04* (2013.01); *F16K 13/08* (2013.01); *F17C 2205/0323* (2013.01)

(58) Field of Classification Search
USPC ........................... 251/231, 78, 232, 235, 279
See application file for complete search history.

(56) References Cited

U.S. PATENT DOCUMENTS

| | | |
|---|---|---|
| 3,406,700 A | 10/1968 | Beazer |
| 3,782,413 A | 1/1974 | Chacko |
| 4,099,551 A | 7/1978 | Billington |
| 4,203,468 A | 5/1980 | Dietz |
| 4,230,161 A | 10/1980 | Billington |
| 4,238,975 A | 12/1980 | Jones |
| 4,310,012 A | 1/1982 | Billington |
| 4,310,026 A | 1/1982 | Oliver |
| 4,459,834 A | 7/1984 | Seki |
| 4,811,752 A | 3/1989 | Lyons |
| 4,872,365 A | 10/1989 | Wolf |
| 4,970,912 A | 11/1990 | Wolf |
| 5,103,852 A | 4/1992 | Jones |
| 5,343,884 A | 9/1994 | Henderson |
| 5,975,160 A | 11/1999 | Rush |
| 6,206,339 B1 | 3/2001 | Parker |
| 6,877,718 B2 | 4/2005 | Nimberger |

FOREIGN PATENT DOCUMENTS

| | | |
|---|---|---|
| FR | 2447493 A1 | 8/1980 |
| GB | 2064731 | 6/1981 |

OTHER PUBLICATIONS

First Office Action from Chinese Patent Application No. 2017800432774, dated Aug. 2, 2019.
Search Report from Chinese Patent Application No. 2017800432774, dated Jul. 25, 2019.

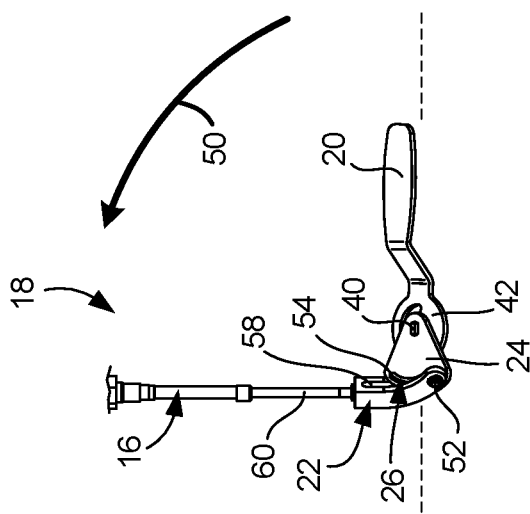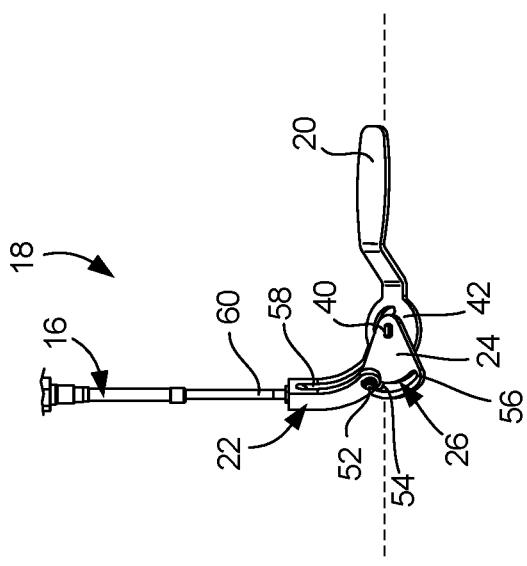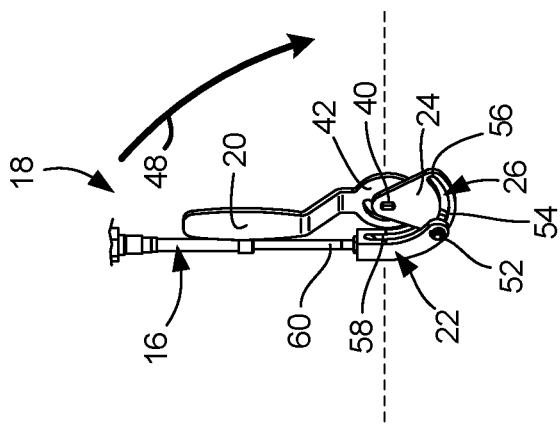

CABLE ACTUATED REMOTE EMERGENCY SHUT-OFF SYSTEM

CROSS-REFERENCE TO RELATED APPLICATION

This application claims the benefit of priority from U.S. Provisional Patent Application Ser. No. 62/362,307, filed Jul. 14, 2016, which is hereby incorporated by reference.

BACKGROUND

In some systems, a valve is connected to a fluid containment unit such as pressure vessel to control fluid flow into and out of the vessel. The present disclosure relates to a system for remotely closing such a valve. The teachings herein are not limited to valves on pressure vessels; rather, they can also be applied to valves on other devices and systems.

SUMMARY

In one aspect, a system includes a valve, a handle, a guide, an arm, a channel, and a projection. The handle is located proximate the valve and is configured to open and close the valve. The handle is in a first handle position when the valve is open, and the handle is in a second handle position when the valve is closed. The guide is connected to the handle. The arm is connected to the guide. The channel is located on one of the guide or the arm, the channel having opposed first and second ends. The projection is located on the other of the guide or the arm, the projection configured to be received in the channel. Moving the projection past a location of the first end of the channel pulls the guide and the handle, thereby moving the handle from the first handle position to the second handle position. The projection can be moved toward the second end of the channel while the handle remains in the second position.

In another aspect, a method for operating a system is disclosed. The system includes a valve, a handle, a guide, an arm, a channel, and a projection. The handle is located proximate the valve and opens and closes the valve. The handle is in a first handle position when the valve is open, and the handle is in a second handle position when the valve is closed. The guide is connected to the handle. The arm is connected to the guide. The channel is located on one of the guide or the arm, the channel having opposed first and second ends. The projection is located on the other of the guide or the arm, the projection configured to be received in the channel. The method includes moving the projection past a location of the first end of the channel to pull the guide and the handle, thereby moving the handle from the first handle position to the second handle position to close the valve. The method further includes moving the projection toward the second end of the channel while maintaining the second position of the handle and the closed state of the valve.

This disclosure, in its various combinations, either in apparatus or method form, may also be characterized by the following listing of items:

1. A system including:
    a valve;
    a handle located proximate the valve and configured to open and close the valve;
        wherein the handle is in a first handle position when the valve is open; and
        wherein the handle is in a second handle position when the valve is closed;
    a guide connected to the handle;
    an arm connected to the guide;
    a channel located on one of the guide or the arm, the channel having opposed first and second ends; and
    a projection located on the other of the guide or the arm, the projection configured to be received in the channel;
    wherein moving the projection past a location of the first end of the channel pulls the guide and the handle, thereby moving the handle from the first handle position to the second handle position; and
    wherein the projection can be moved toward the second end of the channel while the handle remains in the second position.
2. The system of item 1, further including a cable having opposed first and second ends, wherein the first end of the cable is connected to the arm.
3. The system of item 2, further including a lever connected to the second end of the cable.
4. The system of any of items 1-3 wherein the arm includes a passage configured for insertion of a portion of the guide.
5. The system of any of items 1-4, wherein the first handle position and a second handle position are separated by about 90 radial degrees.
6. The system of any of items 1-5, further including:
    a slot located on one of the valve and the handle; and
    a detent located on the other of the valve and the handle, the detent configured to be received in the slot.
7. The system of item 6, wherein relative pivotal motion between the valve and handle is limited by the slot and detent to about 90 radial degrees.
8. The system of any of items 6-7 wherein the slot has an arcuate configuration.
9. The system of any of items 1-8 wherein the channel has an arcuate configuration.
10. The system of any of items 1-9 further including a pressure vessel, wherein the valve is operably connected to the pressure vessel so that:
    when the valve is open, fluid flows into and out of the pressure vessel through the valve; and
    when the valve is closed, fluid does not flow into or out of the pressure vessel through the valve.
11. A method of operating a system, the system including:
    a valve;
    a handle located proximate the valve that opens and closes the valve;
        wherein the handle is in a first handle position when the valve is open; and
        wherein the handle is in a second handle position when the valve is closed;
    a guide connected to the handle;
    an arm connected to the guide;
    a channel located on one of the guide or the arm, the channel having opposed first and second ends; and
    a projection located on the other of the guide or the arm, the projection configured to be received in the channel;
    the method including:
    moving the projection past a location of the first end of the channel to pull the guide and the handle, thereby moving the handle from the first handle position to the second handle position to close the valve; and
    moving the projection toward the second end of the channel while maintaining the second position of the handle and a closed state of the valve.
12. The method of item 11, wherein moving the projection past a location of the first end of the channel includes pulling upon a cable having opposed first and second ends, wherein the first end of the cable is connected to the arm.

13. The method of item 12, wherein pulling upon the cable further includes moving a lever connected to the second end of the cable between a first lever position and a second lever position.

14. The method of item 13, wherein moving the lever from the first lever position to the second lever position causes the second end of the cable to pull upon the arm.

15. The method of any of items 13-14, wherein moving the projection toward the second end of the channel includes moving the lever from the second lever position to the first lever position.

16. The method of any of items 11-15, wherein moving the handle from the first handle position to the second handle position includes pivoting the handle by about 90 radial degrees.

17. The method of any of items 11-16, further including manually moving the handle from the second handle position to the first handle position to open the valve.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

FIG. 5A is a front perspective view of the exemplary valve control assembly, wherein a connected valve (shown in FIG. 4) is open, and the manual handle is in a first position.

FIG. 5B is a front perspective view of the exemplary valve control assembly, wherein the connected valve is closed, and the manual handle is in a second position.

FIG. 5C is a front perspective view of the exemplary valve control assembly, wherein the connected remote lever has been reset, but the valve remains closed, and the manual handle remains in the second position.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

Figure 1:
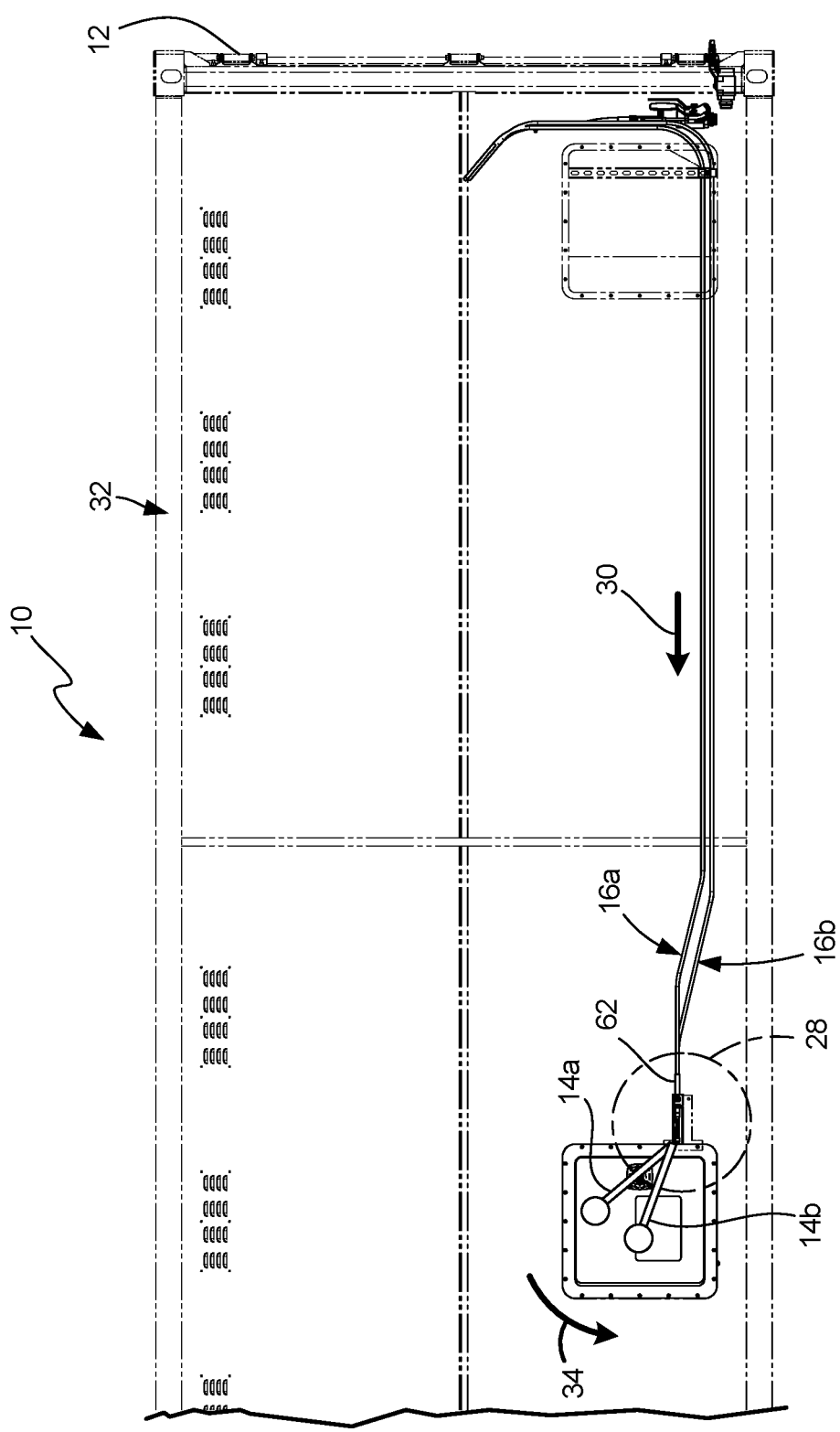
FIG. 1 is a side elevation view of an exemplary cable actuated remote emergency shut-off system.
Figure 2:
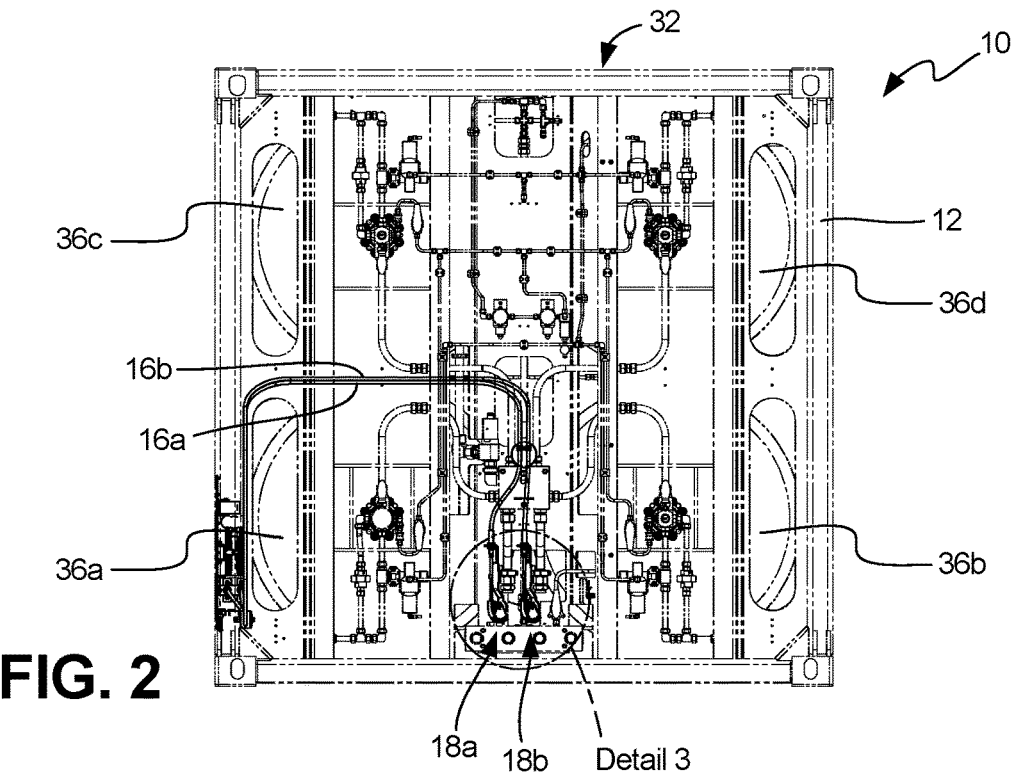
FIG. 2 is a front elevation view of a valve panel of the system of FIG. 1.
Figure 3:
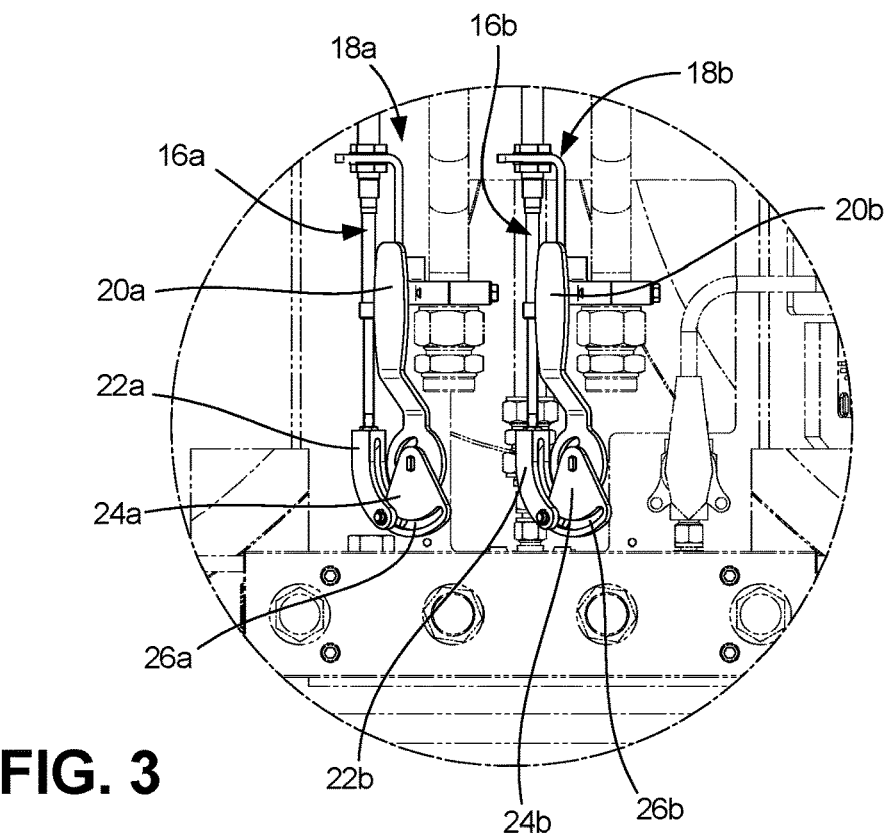
FIG. 3 is an enlarged view of the encircled portion of FIG. 2 (labeled "Detail 3").
Figure 4:
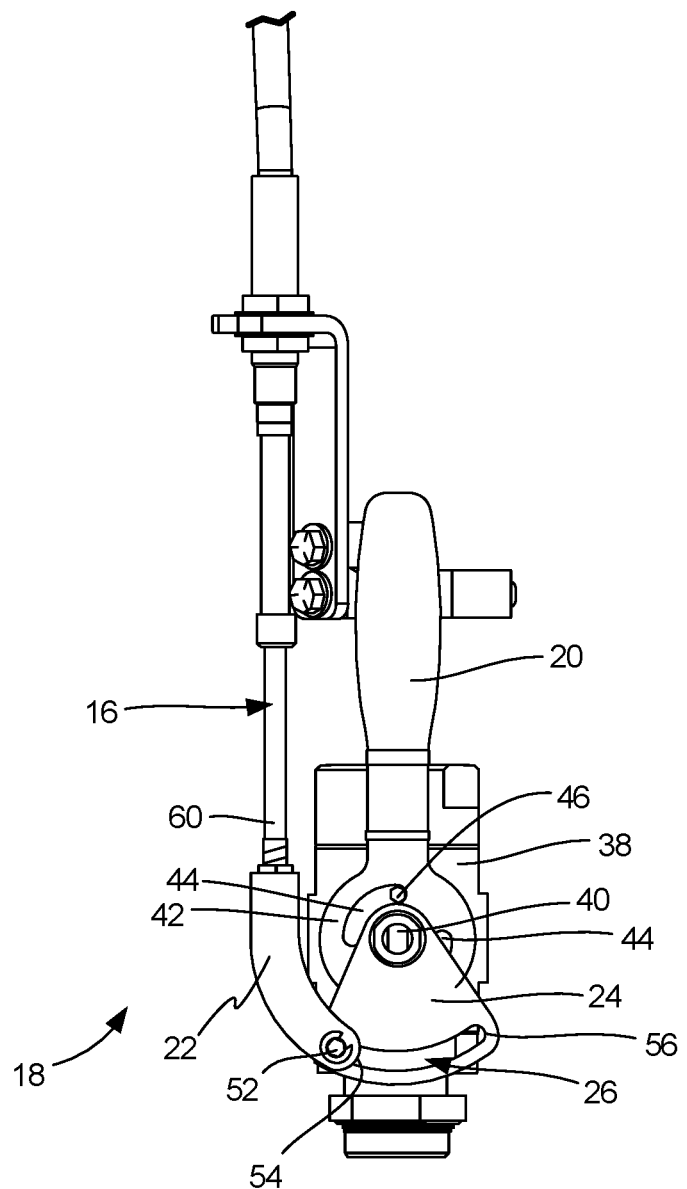
FIG. 4 is a front elevation view of an exemplary valve control assembly of the system of FIG. 1, connected to a valve.

This disclosure describes a cable-actuated emergency shut-off system 10, such as for controlling a valve 38 (FIG. 4) between a fluid source (not shown) and a pressure vessel 36 (FIG. 2). FIG. 1 shows an exemplary system 10 wherein valves 38 (FIG. 4) behind valve panel 12 (FIG. 2) can be remotely controlled by levers 14 at another location via the pulling of cables 16, which extend between valve panel 12 and levers 14. A front view of the valve panel 12 is shown in FIG. 2, wherein two control assemblies 18 are illustrated, each control assembly operating a corresponding valve 38 (FIG. 4). In an exemplary embodiment, each of the control assemblies 18 is remotely operated by a separate corresponding lever 14. As shown in FIGS. 2-5A, when manual handles 20 are oriented vertically (i.e., a first position of the handle), the respective connected valves 38 (FIG. 4) are in an open configuration. In such an open configuration, fluid may flow through the valve 38, such as into and out of a connected pressure vessel 36. As shown in FIGS. 1 and 2, housing 32 is configured to contain four pressure vessels 36a-36d, with fluid ingress and egress from each pressure vessel 36 controlled by a valve 38 operated by one of the valve control assemblies 18 (labeled in FIGS. 2 and 3) located on valve panel 12.

As shown in FIG. 1, in an exemplary embodiment of system 10, a lever 14 is connected by a corresponding cable 16 to one of the valve control assemblies 18. Connected components are labeled in the drawing figures with the same letter designation. However, it is contemplated that components may be connected in a different manner than illustrated. Linkages in encircled portion 28 connect each lever 14 to its corresponding cable 16 in a known manner. In an exemplary system 10, levers 14 are in an initial raised position when valves 38 of pressure vessels 36 are open. To close such valves, ends of levers 14 are pushed by a user in a desired direction (e.g., downward in direction 34). Conventional linkages (not shown) connecting lever 14 to end 62 of cable 16 translate the user-directed motion on lever 14 to a pulling motion upon its connected cable 16 in direction 30. This motion, in turn, pulls upward on end 60 of cable 16 at the corresponding valve control assembly 18, as shown in FIG. 3. In FIG. 1, lever 14b is illustrated as being in a lower position than lever 14a. However, this depiction is provided only to allow for visual distinction between the two levers 14a, 14b in FIG. 1. In an actual use, the two levers 14a, 14b may be set to the same position when their corresponding valves are in the same open or closed position, for example. While system 10 is illustrated as having two levers 14 attached by corresponding cables 16 to two corresponding valve control assemblies 18, it is contemplated that more or fewer such assemblies may be provided in a remote shut off system.

FIG. 4 is a front elevation view of valve control assembly 18 connected to valve 38. FIG. 5A is a front perspective view of valve control assembly 18, wherein valve 38 (not visible) is open, and manual handle 20 is in a first position. FIG. 5B is a front perspective view of valve control assembly 18, wherein valve 38 is closed, and manual handle 20 is in a second position. FIG. 5C is a front perspective view of valve control assembly 18, wherein the connected remote lever 14 has been reset to its initial, raised position; however, valve 38 remains closed, with manual handle 20 remaining in the second position.

In FIG. 4, valve panel 12 is not shown so that valve 38, controlled by valve control assembly 18, is visible. In an exemplary embodiment, valve 38 is a conventional quarter-turn valve, which is opened and closed by turning valve shaft 40 approximately 90 radial degrees. Valve 38 is fluidly connected to one or more pressure vessels 36 in a known manner by fluid connection lines (not shown) to allow for fluid communication into and out of the connected pressure vessel(s) 36 when valve 38 is open, and prevents such fluid communication into and out of the connected pressure vessel(s) 36 when valve 38 is closed.

As shown in FIG. 1, in an exemplary embodiment, an operator may remotely control valve 38 connected to a valve control assembly 18 by pushing downward on the corresponding lever 14 in direction 34. This downward motion on lever 14 pulls a corresponding cable 16, which is attached at its other end 60 to arm 22. As shown in FIGS. 5A-5B, as cable 16 and its attached arm 22 are pulled upward, manual handle 20 is rotated in a clockwise direction to a horizontal orientation (i.e., a second position of the handle), thereby closing its respective valve 38. Accordingly, in an emergency situation, such as if there is a fire in the vicinity of a valve control assembly 18, thereby preventing a user from manually turning handle 20 to close valve 38, a user can remotely shut off the connected valve 38 without coming into proximity with the danger by actuating lever 14, which is remotely connected to valve control assembly 18 by cable 16. As shown in FIG. 5C, after the danger has passed, to again open valve 38, the user manually moves the handle 20 in direction 50 back to the vertical orientation shown in FIGS. 2-5A.

In an exemplary embodiment, guide 24 is provided at an end of handle 20 and in contact with arm 22. Guide 24 in an exemplary embodiment is configured as a plate with an elongated channel therein. As shown in FIGS. 5B and 5C, projection 52 of arm 22 can move between ends 54 and 56 of channel 26 (configured as a slot or groove, for example) without moving guide 24. Moreover, passage 58 in arm 22 allows a portion of guide 24 surrounding channel 26 to move into and relative to arm 22. These cooperating features allow a remote user to reset remote lever 14, thereby pushing downward on arm 22 via cable 16, while not changing the position of the manual handle 20 or the closed state of the connected valve 38.

In the embodiment illustrated in FIG. 2, system 10 includes four pressure vessels 36a-36d. In the illustrated embodiment, control valve assembly 18a operates a valve 38 that is connected by fluid lines in a known manner to pressure vessels 36a and 36c. In a like manner, valve control assembly 18b is connected by fluid lines in a known manner to control fluid communication into and out of pressure vessels 36b and 36d. Other arrangements of valve control assemblies, valves and connected pressure vessels can also be used. For example, a valve control assembly may control a valve that is fluidly connected to only a single pressure vessel. In other cases, a valve control assembly can control a valve that is connected to three or more pressure vessels.

As illustrated, in an exemplary embodiment, an open or closed state of valve 38 is controlled by an orientation of valve shaft 40. In an exemplary embodiment, valve shaft 40 has an elongated configuration with flat sides that can be engaged by handle 20, guide 24 and associated fasteners to permit operation of valve 38 by handle 20 and guide 24. In the illustrated embodiment, valve 38 is open when valve shaft 40 is in the generally vertical orientation shown in FIGS. 4 and 5A. In the illustrated embodiment, valve 38 is in a closed configuration when valve shaft 40 is in the generally horizontal configuration shown in FIGS. 5B and 5C. In the illustrated embodiment, handle 20 is integrally formed with plate 42, which is fixed to rotate with guide 24 about the pivot point defined by valve shaft 40. In another embodiment, plate 42 and guide 24 could be formed as a single structure. Plate 42 includes an arcuate channel or slot 44 that is formed as a quarter circle and interacts with detent 46, such as a stop pin, on valve 38 to permit pivotal motion of handle 20 only between the first position shown in FIGS. 4 and 5A and the second position shown in FIGS. 5B and 5C, in the pivot directions 48 and 50. A redundant set of slots 44 and stop detent 46 can also be provided on an opposite side of plate 42, primarily hidden from view by guide 24 in FIG. 4.

As shown in FIGS. 4 and 5A, valve 38 is open when valve shaft 40 and handle 20 are oriented in a first position, which is substantially vertical as illustrated. Referring again to FIG. 1, when a user remotely pulls downward on a lever 14 in direction 34, this action pulls upon cable 16 in a direction 30, resulting in an upward motion of cable 16 at valve control assembly 18, as evident in a comparison of the positions of cable 16 at its end 60 in FIGS. 5A and 5B. In an exemplary embodiment, arm 22 connected to end 60 of cable 16 includes a projection in the form of pin 52, which travels in channel 26. As cable 16 is pulled upward, pin 52 of arm 22 impacts a first end 54 of channel 26, thereby pulling guide 24, plate 42, and its connected handle 20 to pivot these structures about valve shaft 40 in direction 48. This motion thereby results in movement of handle 20 and valve shaft 40 to the second position shown in FIG. 5B, wherein the connected valve 38 is closed.

Referring to FIG. 1, to reset system 10, a user may return lever 14 to its raised position by pivoting lever 14 in the direction opposite that of direction 34. While cable 16 is flexible, it does possess stiffness that returns its end 60 at arm 22 to the lower position shown in FIG. 5C when lever 14 is reset (so that cable 16 is moved in a direction opposite direction 30). As shown by a comparison of FIGS. 5B and 5C, pin 52 travels within channel 26 toward an opposite end 56, allowing a reset of lever 14 while maintaining handle 20, valve shaft 40 and the connected valve 38 in the closed, second position. When an operator wishes to reopen valve 38, such as when it has been ascertained that no fire or other danger remains proximate valve control assembly 18, the operator can manually move handle 20 in pivot direction 50 back to the first position shown in FIG. 5A, thereby reopening valve 38. Thus, a user may close valve 38 directly (i.e., manually by turning handle 20) or remotely (i.e., by manipulating lever 14 of cable actuation system 10). However, a valve 38 can be opened only directly, by manually turning handle 20 from the second position shown in FIGS. 5B and 5C to the first position shown in FIGS. 2-5A.

It should be noted that a user need not reset remote lever 14 before opening valve 38; rather, a user can move valve control assembly 18 directly from the configuration shown in FIG. 5B to the configuration shown in FIG. 5A by pivoting manual handle 20 about pivot shaft 40 in direction 50. Remote lever 14 may be reset before or after manually reopening valve 38.

While the exemplary illustrated embodiment shows guide 24 and plate 42 with channels or slots 26 and 44 for receiving projections 52 and 46, it is contemplated that these cooperating features can be conversely provided on the components. For example, arm 22 may include a slot configured to cooperate with a projection provided on guide 24. Moreover, while channels for receiving projections are particularly described, it is contemplated that other cooperating features for allowing controlled relative motion between components can also be used, such as tracks for receiving rollers, for example.

Non-limiting descriptions of exemplary embodiments follow. System 10 includes valve 38, handle 20, guide 24, arm 22, channel 26, and projection 52. Handle 20 is located proximate valve 38; operation of handle 20 opens and closes valve 38. Handle 20 is in a first handle position, shown in FIGS. 2-5A, when valve 38 is open. Handle 20 is in a second handle position, shown in FIGS. 5B-5C, when valve 38 is closed. Guide 24 is connected to handle 20, such as via plate 42 at an end of handle 20. Arm 22 is connected to the guide 24, such as via the insertion of projection 52 of arm 22 into channel 26 of guide 24. Channel 26 has an arcuate configuration and is located on one of guide 24 or arm 22. Channel 26 has opposed first end 54 and second end 56. Projection 52 is located on the other of guide 24 or arm 22, projection 52 being configured to be received in channel 26. As shown in FIGS. 5A and 5B, moving projection 52 past a location of the first end 54 of channel 26 pulls guide 24 and handle 20 about the pivot point of valve shaft 40, thereby moving handle 20 from the first handle position to the second handle position. As shown in FIGS. 5A and 5B, the first handle position and the second handle position are separated by about 90 radial degrees.

As shown in FIG. 5C, projection 52 can be moved toward the second end 56 of channel 26 while handle 20 remains in the second position because arm 22 includes passage 58, which is configured for insertion of a portion of guide 24 surrounding channel 26. Such motion can typically occur during resetting of lever 14 from a second, lowered position to an initial, raised position. Valve 38 can be opened by manually moving handle 20 from the second handle position to the first handle position in direction 50.

System 10 further includes cable 16 having opposed first end 60 and second end 62, wherein first end 60 of cable 16 is connected to arm 22. Lever 14 is connected to second end 62 of cable 16. In a method of operating system 10, moving lever 14 between a first lever position and a second lever position pulls second end 62 of cable 16, thereby transmitting the motion in direction 30 to first end 60 of cable 16 and its connected arm 22.

As shown in FIG. 4, slot 44 is located on one of valve 38 and handle 20; detent 46 is located on the other of valve 38 and handle 20, wherein detent 46 is configured to be received in slot 44. Relative pivotal motion between valve 38 and handle 20 is limited by slot 44 and detent 46 to about 90 radial degrees. Slot 44 has an arcuate configuration.

System 10 further includes a pressure vessel 36, wherein valve 38 is operably connected to pressure vessel 36. When valve 38 is open, fluid flows into and out of the pressure vessel 36 through valve 38. When valve 38 is closed, fluid does not flow into or out of the pressure vessel 36 through valve 38.

Although the subject of this disclosure has been described with reference to several embodiments, workers skilled in the art will recognize that changes may be made in form and detail without departing from the scope of the disclosure. For example, while arm 22 is illustrated as having an elongated configuration, in this application, the term "arm" can refer to an element having a substantially similar function, even if it does not have an elongated shape. Moreover, while a quarter-turn valve 38 is described, other types of valves can be used which have opened and closed configurations provided by geometric relations other than a "quarter turn." Accordingly, it is to be understood that the teachings herein are adaptable to valves and handles with elements that move in other relationships, such as other radial arcs and linear and curvilinear displacements, for example. In addition, any feature disclosed with respect to one embodiment may be incorporated in another embodiment, and vice-versa.

The invention claimed is:

1. A system including:
    a handle located proximate a valve and configured to open and close the valve;
        wherein the handle is in a first handle position when the valve is open; and
        wherein the handle is in a second handle position when the valve is closed;
    a guide connected to the handle;
    an arm connected to the guide;
    a channel located on one of the guide or the arm, the channel having opposed first and second closed ends; and
    a projection located on the other of the guide or the arm, the projection configured to be received in the channel;
    wherein moving the projection past a location of the first end of the channel pulls the guide and the handle, thereby moving the handle from the first handle position to the second handle position; and
    wherein the projection can be moved toward the second end of the channel while the handle remains in the second position.

2. The system of claim 1, further including a cable having opposed first and second ends, wherein the first end of the cable is connected to the arm.

3. The system of claim 2, further including a lever connected to the second end of the cable.

4. The system of claim 1, further including:
    a slot located on one of the valve and the handle; and
    a detent located on the other of the valve and the handle, the detent configured to be received in the slot.

5. The system of claim 4 wherein the slot has a closed, elongated arcuate configuration.

6. The system of claim 1 wherein the channel has an arcuate configuration.

7. The system of claim 1 further including a pressure vessel, wherein the valve is operably connected to the pressure vessel so that:
    when the valve is open, fluid flows into and out of the pressure vessel through the valve; and
    when the valve is closed, fluid does not flow into or out of the pressure vessel through the valve.

8. A system including:
    a handle located proximate a valve and configured to open and close the valve;
        wherein the handle is in a first handle position when the valve is open; and
        wherein the handle is in a second handle position when the valve is closed;
    a slot located on one of the valve and the handle, wherein the slot has a closed, elongated arcuate configuration;
    a detent located on the other of the valve and the handle, the detent configured to be received in the slot;
    a guide fixedly connected to the handle;

an arm moveably connected to the guide, wherein the arm includes a passage configured for insertion of a portion of the guide;

a channel located on one of the guide or the arm, the channel having opposed first and second ends; and a projection located on the other of the guide or the arm, the projection configured to be received in the channel;

wherein moving the projection past a location of the first end of the channel pulls the guide and the handle, thereby moving the handle from the first handle position to the second handle position; and wherein the projection can be moved toward the second end of the channel while the handle remains in the second position.

9. The system of claim 8, further including a cable having opposed first and second ends, wherein the first end of the cable is connected to the arm.

10. The system of claim 9, further including a lever connected to the second end of the cable.

11. The system of claim 8 wherein the channel has an arcuate configuration.

12. The system of claim 8 further including a pressure vessel, wherein the valve is operably connected to the pressure vessel so that:

when the valve is open, fluid flows into and out of the pressure vessel through the valve; and when the valve is closed, fluid does not flow into or out of the pressure vessel through the valve.

13. A method of operating a system, the system including:

a valve;

a handle located proximate the valve that opens and closes the valve;

wherein the handle is in a first handle position when the valve is open; and wherein the handle is in a second handle position when the valve is closed;

a guide connected to the handle;

an arm connected to the guide;

a channel located on one of the guide or the arm, the channel having opposed first and second closed ends; and a projection located on the other of the guide or the arm, the projection configured to be received in the channel;

the method including:

moving the projection past a location of the first end of the channel to pull the guide and the handle, thereby moving the handle from the first handle position to the second handle position to close the valve; and moving the projection toward the second end of the channel while maintaining the second position of the handle and a closed state of the valve.

14. The method of claim 13, wherein moving the projection past a location of the first end of the channel includes pulling upon a cable having opposed first and second ends, wherein the first end of the cable is connected to the arm.

15. The method of claim 14, wherein pulling upon the cable further includes moving a lever connected to the second end of the cable between a first lever position and a second lever position.

16. The method of claim 15, wherein moving the lever from the first lever position to the second lever position causes the second end of the cable to pull upon the arm.

17. The method of claim 15, wherein moving the projection toward the second end of the channel includes moving the lever from the second lever position to the first lever position.

18. The method of claim 13, further including manually moving the handle from the second handle position to the first handle position to open the valve.

* * * * *